(12) United States Patent
Valin

(10) Patent No.: US 6,263,720 B1
(45) Date of Patent: Jul. 24, 2001

(54) METHOD FOR MAKING WING-SHAPED PARTS AND RESULTING PARTS

(75) Inventor: Daniel Valin, Saint-Amand-sur-Fion (FR)

(73) Assignee: Vallourec Composants Automobiles Vitry, Vitry-le-Francois (FR)

( * ) Notice: Subject to any disclaimer, the term of this patent is extended or adjusted under 35 U.S.C. 154(b) by 0 days.

(21) Appl. No.: 09/403,002
(22) PCT Filed: Apr. 16, 1998
(86) PCT No.: PCT/FR98/00769
  § 371 Date: Oct. 15, 1999
  § 102(e) Date: Oct. 15, 1999
(87) PCT Pub. No.: WO98/47644
  PCT Pub. Date: Oct. 29, 1998

(30) Foreign Application Priority Data

Apr. 18, 1997 (FR) .................................................. 97/05177

(51) Int. Cl.$^7$ .................................................. B21D 41/00
(52) U.S. Cl. ................. 72/370.13; 72/370.1; 29/888.092
(58) Field of Search ............................. 72/370.1, 370.12, 72/370.13, 370.16, 370.19, 370.2, 370.23; 29/888.092, 897.2

(56) References Cited

U.S. PATENT DOCUMENTS

| | | | |
|---|---|---|---|
| 2,133,092 | * 10/1938 | Gettig | 72/370.27 |
| 2,205,893 | * 6/1940 | Unger | 72/370.16 |
| 3,181,336 | 5/1965 | Schofield | 72/340 |
| 4,088,001 | 5/1978 | Ishikawa et al. | 72/370 |
| 4,095,450 | * 6/1978 | Opland et al. | 72/370.23 |
| 4,192,396 | 3/1980 | Austermann, Jr. et al. | 180/252 |
| 4,621,421 | * 11/1986 | O'Loughlin | 72/370.1 |
| 5,070,717 | * 12/1991 | Boyd et al. | 72/370.23 |

FOREIGN PATENT DOCUMENTS

| | | |
|---|---|---|
| 1 813 978 | 7/1970 | (DE) . |
| 33 35 912 | 4/1985 | (DE) . |
| 2 734 207 | 11/1996 | (FR) . |
| 2 737 177 | 1/1997 | (FR) . |
| 2 197 051 | 5/1988 | (GB) . |

* cited by examiner

*Primary Examiner*—Ed Tolan
(74) *Attorney, Agent, or Firm*—Jacobson, Price, Holman & Stern, PLLC

(57) ABSTRACT

A method including the following successive operations carried out on a tube section: a) swaging one end to form at least two longitudinal strips folded down edge to edge and radially projecting outwards; b) cutting out the external projection of the strips to obtain at least two longitudinally separate tabs; and c) shaping the tabs into wings. The method can be used for making stirrups or fork joints at the end of a tubular part. It can also be used to produce semirigid axles or cradles for motor vehicles.

12 Claims, 6 Drawing Sheets

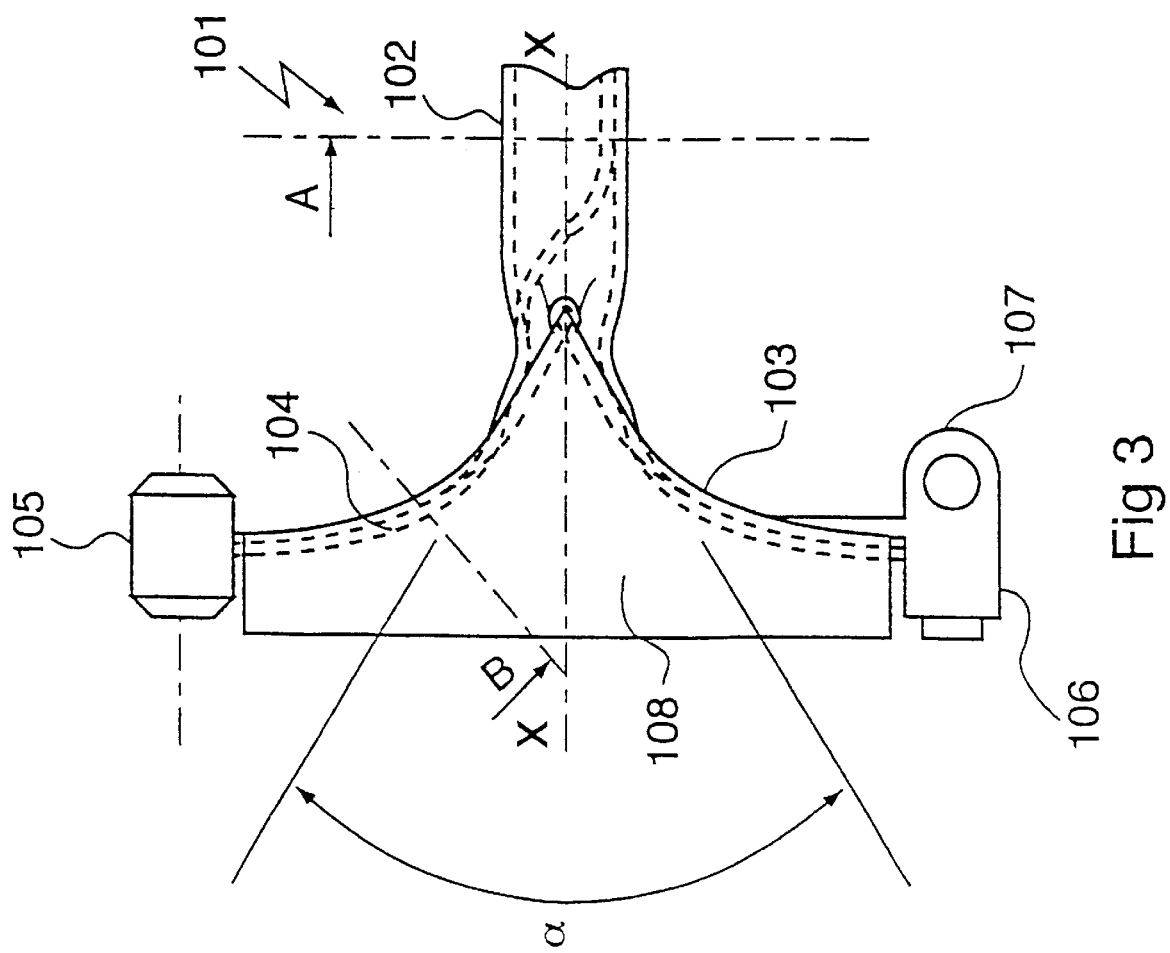
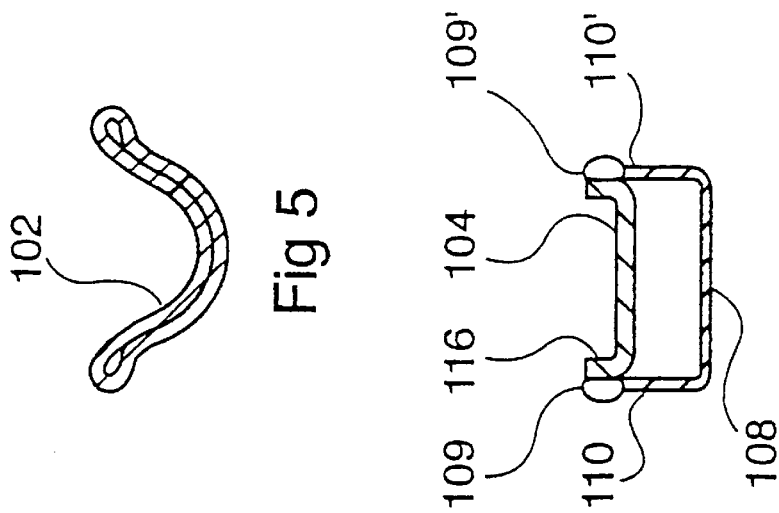
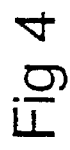

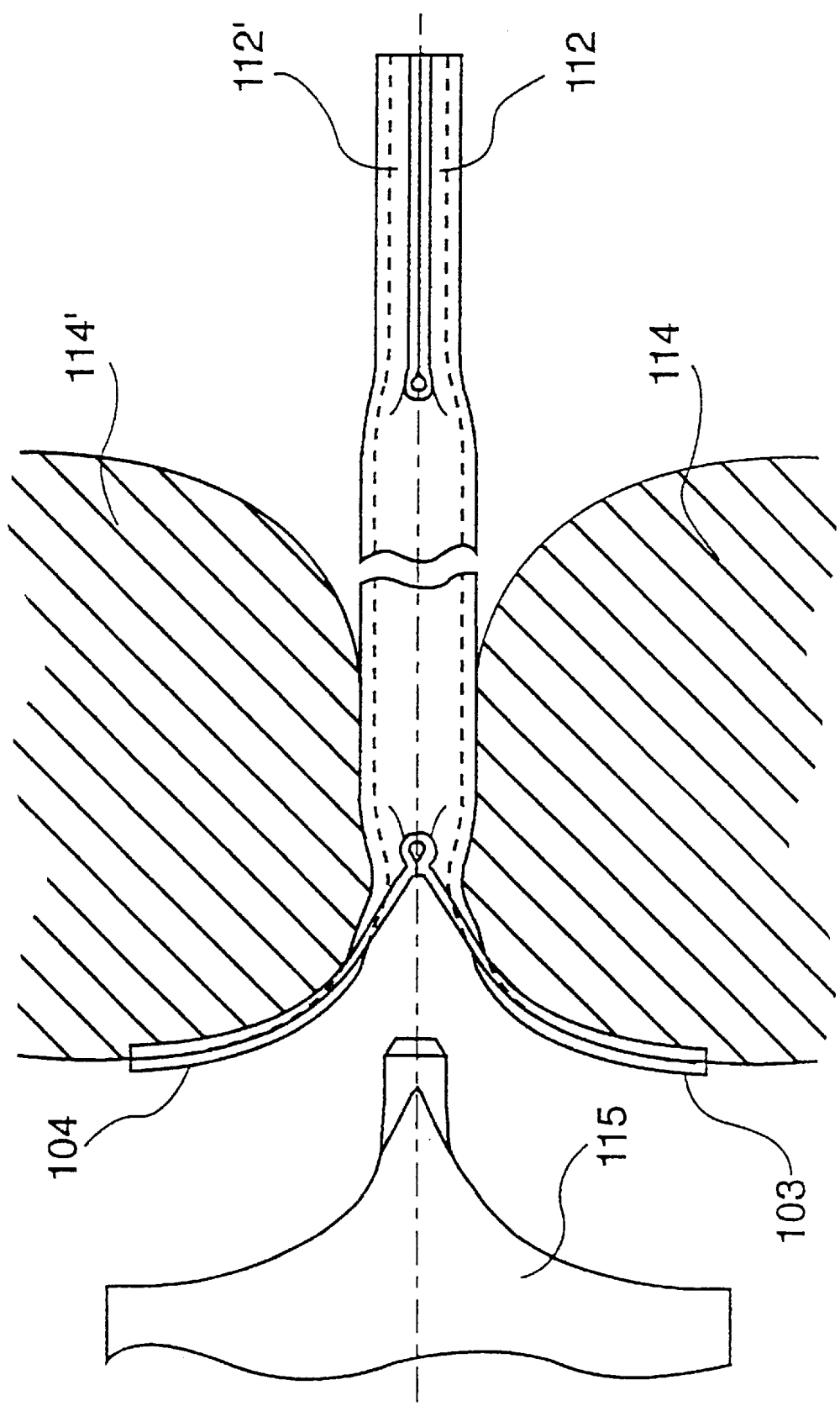

METHOD FOR MAKING WING-SHAPED PARTS AND RESULTING PARTS

This application is a 35 USC 371 of PCT/FR98/00769 filed Apr. 16, 1998.

The instant invention pertains to the plastic deformation forming of metals, and concerns a manufacturing process for wing-shaped metal parts by way of plastic deformation of a tubular part, as well as parts resulting from this process.

The wing-shaped metal parts are normally used in mechanical assemblies and more particularly in the assembly of automobiles.

For the purposes of the instant request, the term wing-shaped parts designates U-shaped or fork links types of parts used to support a pin. It also designates, in a more general manner, parts consisting of wings, i.e. parts whose shapes are more or less elongated or streamlined, manufactured or affixed to a base, wings which are not necessarily parallel to each other, and whose function may be something quite other than supporting a pin i.e. each wing having its own function.

These wing-shaped components may be manufactured on all kinds of parts. The invention concerns the manufacturing of such wing-shaped parts as integral components of a tube extremity, the wings and tube extremity forming one and same component.

Patent GB 2,197,051 describes such a wing-shaped fork link part for a universal joint obtained by way of sheet metal stamping, the central section of the fork link forming a collar with teeth on the inside, for slide mounting on a steering shaft. In this case, the fork link is not merged with a tube-shaped part.

One can contemplate, in other cases, to weld fork links, but this technique has several drawbacks, namely the need to supply separately tube-shaped and U-shaped parts, and to oversee the resulting merchandise stocks, and the presence of welded joints which constitute preferential crack areas in the case of parts subject to fatigue stresses. These welded joints, therefore, require to be inspected, and their presence is not desired in safety parts.

We are aware of U-shaped or fork links merged with tubular parts; patent FR 2,392,838 describes tubular semi-axles for vehicles, but does not describe the manner for making such parts.

We are also aware of tubular parts in the shape of wings whose extremities were split and pulled apart so as to form separate branches.

Hence, the French patent application FR 2,734,207 described a semi-rigid axle for vehicles consisting of a tube whose extremities are split and then pulled apart at an angle lesser than 180° to form two branches in the shape of Y.

We are also aware of similar parts, such as those described in the French patent application FR 2,737,177, consisting of forward or rear subframes for vehicle undercarriages.

The range of manufacturing, described in document FR 2,734,207, consists in making on the extremity of the tubular part longitudinal slits and then to flare the tongues obtained to form wings and to finish the part.

The instant invention has as purpose the manufacturing of parts in the shape of wings, allowing to avoid the problems encountered with prior techniques in which the wings are assembled, such as with welding, onto a base component.

In the instant invention, it was sought to create a particularly effective process with regard to productivity and cost for implementation.

We also sought to improve the existing manufacturing process for wing-shaped parts made of tubes, especially the process described in documents FR 2,734,207 and FR 2,737,177, it being understood that the process for the invention is in no way limited to the applications and scope described in these two documents.

In accordance with the invention, the process for manufacturing metal parts in the shape of wings consists in taking a tube portion and realizing on the extremities of the tube portion the following successive operations:

flattening of an area of the extremity of a tube portion over a certain length, so as to shape two longitudinal beads projecting toward the outside by folding over as a hair pin from the wall of the tube portion;

cutting out of the beads obtained in the preceding operation so as to obtain at least two tongues, separated in a longitudinal manner;

spreading away of the tongues from the body of the tube to constitute wings and shape the latter;

these wings may essentially undergo finishing, before or after shaping.

By tube portion is understood any portion of a tube of which the method of manufacturing, length, radial dimensions, cross-section and nature of the material are adapted to the wing-shaped part to be manufactured. In particular, this tube does not necessarily have a constant cross-section or thickness over its entire length, and its cross-section is not necessarily a revolving one. Steel or any other metal may be used.

Preferentially, the flattening of an area of the extremity of the tube portion so as to shape at least two longitudinal beads shall be conducted by way of unsupported deformation without using a mandrel or inside tube support, and, as a great advantage, the flattening shall be conducted via compression between two dies of which the shape allows for at least supporting the outside wall of the tube between the beads.

As an advantage, the cutting of the beads shall be done by way of shearing off.

As an advantage, the longitudinal beads formed at the extremity of the tube portion shall number two, the part obtained, therefore, consisting of two wings. In the case of a revolution tube portion, these two beads shall preferably be positioned symmetrically with regard to the axis of the extremity of the tube portion.

It should be noted that, in general, the cutting of the beads will not require any inside tooling of the tube portion, thus facilitating the shaping operation following the cutting.

The tongues obtained at the extremity of the tube portion following the bead cutting show curvature or counter-curvature arising from the rest of the beads at the level of their lateral edges and from the initial shape of the tube cross-section. These curvatures or counter-curvatures may be kept, whole or in part, or eliminated, whole or in part, during the shaping and/or finishing operations of the wings.

The shaping of the wings is an operation of plastic deformation allowing to give to the obtained tongues, following the cutting operation, their final and desired shape. It may be done by any known means, in one or several operations, and, for example by splaying or spacing inside shaping dies with a punch-type tool.

The finishing operations are proper to each part.

The overall operations in accordance with the invention process may be repeated at the other extremity of the tube portion should it be required to shape a part with wings at both ends.

The curvature obtained at the stage of cutting the beads allows to increase the inertia module of the wings and, therefore, to render them rigid in longitudinal deflection and twisting. It would, therefore, be advantageous to preserve that curvature for certain applications.

Such wings can, however, be deformed longitudinally, namely by way of bending, without the risk of tearing the most elongated areas as long as they are almost flat, transversally.

The invention has the advantage of making parts consisting of two parallel wings at the extremity of the tube portion.

In this case, the flattening of the extremity of the tube portion is done so as to form two opposed beads, and the tongues obtained after cutting are spread parallel to the axis of the tube portion while being shaped, so as to form two parallel wings at a distance from each other, wings which can, for example, be flat.

As an advantage, the shaped wings can be pierced across from each other during the finishing operation to allow to lodge a perpendicular yoke pin at the level of the wings and hence form a fork link.

The invention also allows, as an advantage, to manufacture parts consisting of two Y-shaped wings at the extremity of a tube portion.

In this case, after flattening the beads and cutting them, the operation for shaping the wings is done with a punch spreading the tongues out of the tube portion and eliminating, or leaving, the transverse curvature of the tongues after cutting.

The dihedral angle formed by the wings at their merging point is lesser than 180°, but the wings can be bent longitudinally along a curve, such as a circle arc, so that the angle formed by the wing extremities can be significantly smaller or larger than the angle formed at their merging point. The elimination of the transverse curve of the wings allows to bend them longitudinally without any significant risk of tearing.

Furthermore, in accordance with the invention, all of the preceding operations may be conducted on the other extremity of the tube portion and parts can be added, such as by welding, on the four shaped wings.

We can, therefore, manufacture a semi-rigid axle or a subframe for motor vehicles by giving a Y-shape to the two extremities of a tube portion of which the central portion is deformed to obtain the overall determined elastic properties, parts such as elastic joint supports, wheel supports, spring ends being attached at the level of wings by way of an operation such as welding.

As a complement, we can close the space between the wings of a same Y and render rigid the dihedral angle between them by attaching a U-section housing to the edges of the wings by way as a welding-type operation or something similar.

The instant invention also concerns metal parts in the shape of wings obtained by way of the process in accordance with the invention.

The figures attached hereto describe, but are not limited to, a particular manner of realizing the process in accordance with the invention, as well as several examples of parts in the shape of wings obtained via the process.

FIG. 1 shows the chain of operations for obtaining a fork link merged with the extremity of a tube, in accordance with the invention.

FIG. 1 *a*) shows the flattening operation, seen from the extremities in straight section, the tool being shown in cross-section.

FIG. 1 *b*) shows the shape of the plated beads, seen from the side.

FIG. 1 *c*) shows the longitudinal cutting operation of the edges of the beads obtained from the preceding operation, seen at the extremity on the right section, the tooling being represented in cross-section.

FIG. 1 *d*) shows a side view of the shape of the tongues after cutting.

FIG. 1 *e*) shows a side view of the shaping operation of the fork link wings, the shaping dies being shown in cross-section and the mandrel released.

FIG. 1 *f*) shows a front view of the fork link after the shaping of the wings.

FIG. 1 *g*) shows a view from above of the fork link after punching the holes for a pin or a spider web and eventual finishing cuts.

FIG. 3 shows an example of a semi-rigid rear axle for motor vehicle.

FIG. 4 shows a detail of a sectional drawing of FIG. 3, in accordance with plan B.

FIG. 5 shows another detail of the same sectional drawing of FIG. 3 in accordance with plan A.

FIG. 6 shows the stage of shaping the semi-rigid rear axle for motor vehicle in FIG. 3; the shaping dies are shown in a sectional drawing and the mandrel released.

Figure 1A:
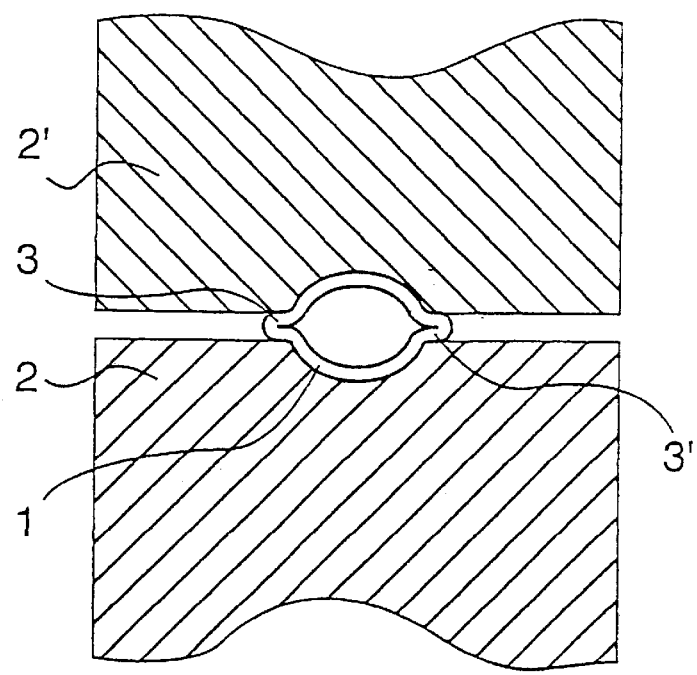
Figure 1B:
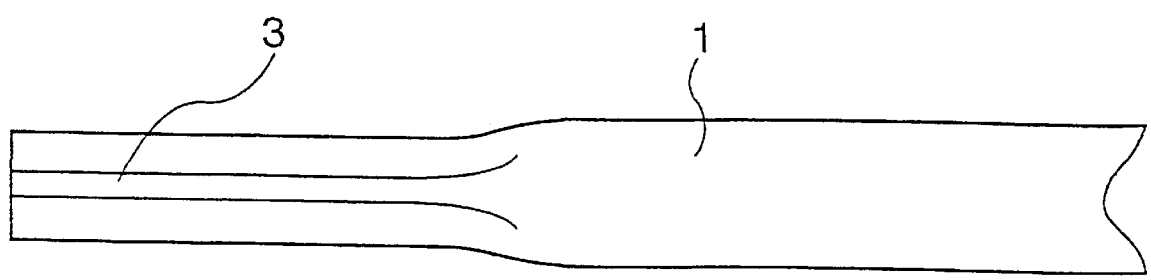
Figure 1C:
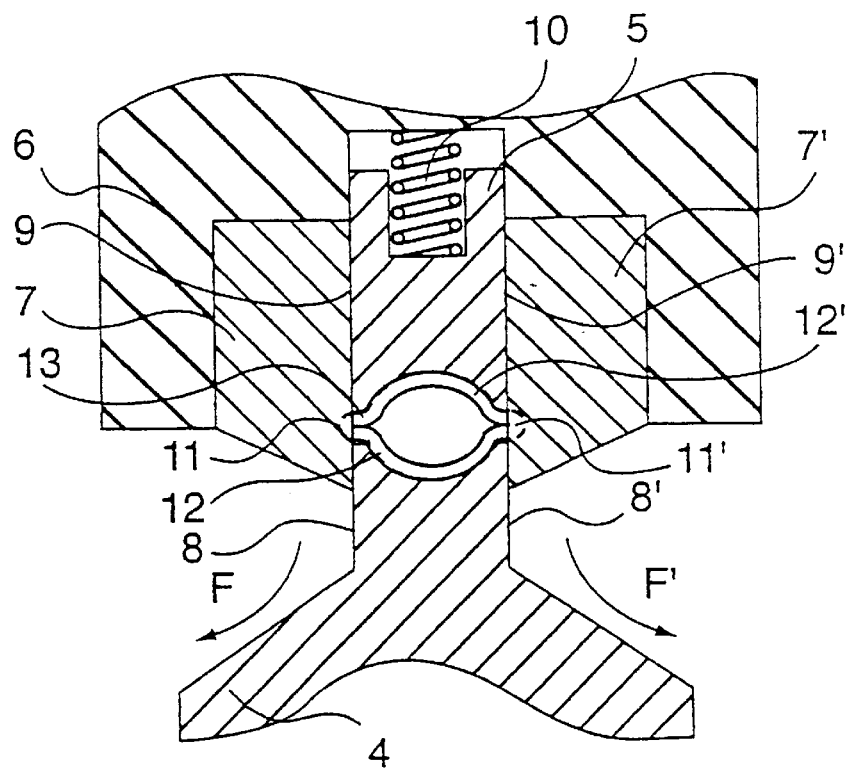
Figure 1D:
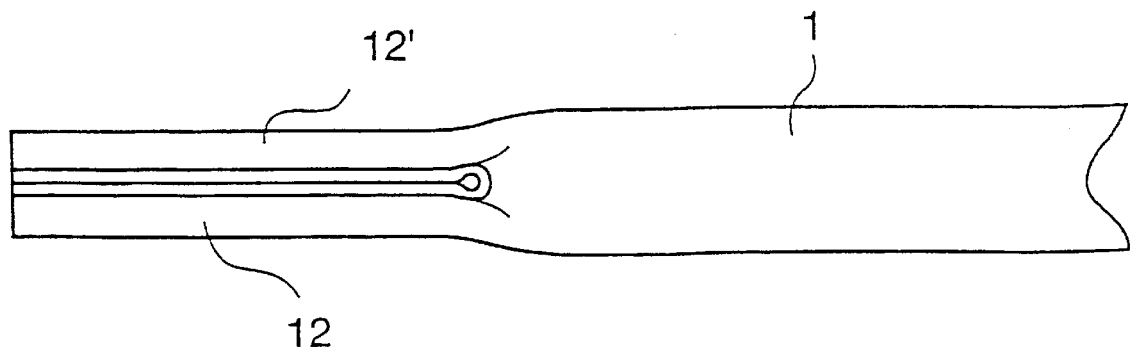
Figure 1E:
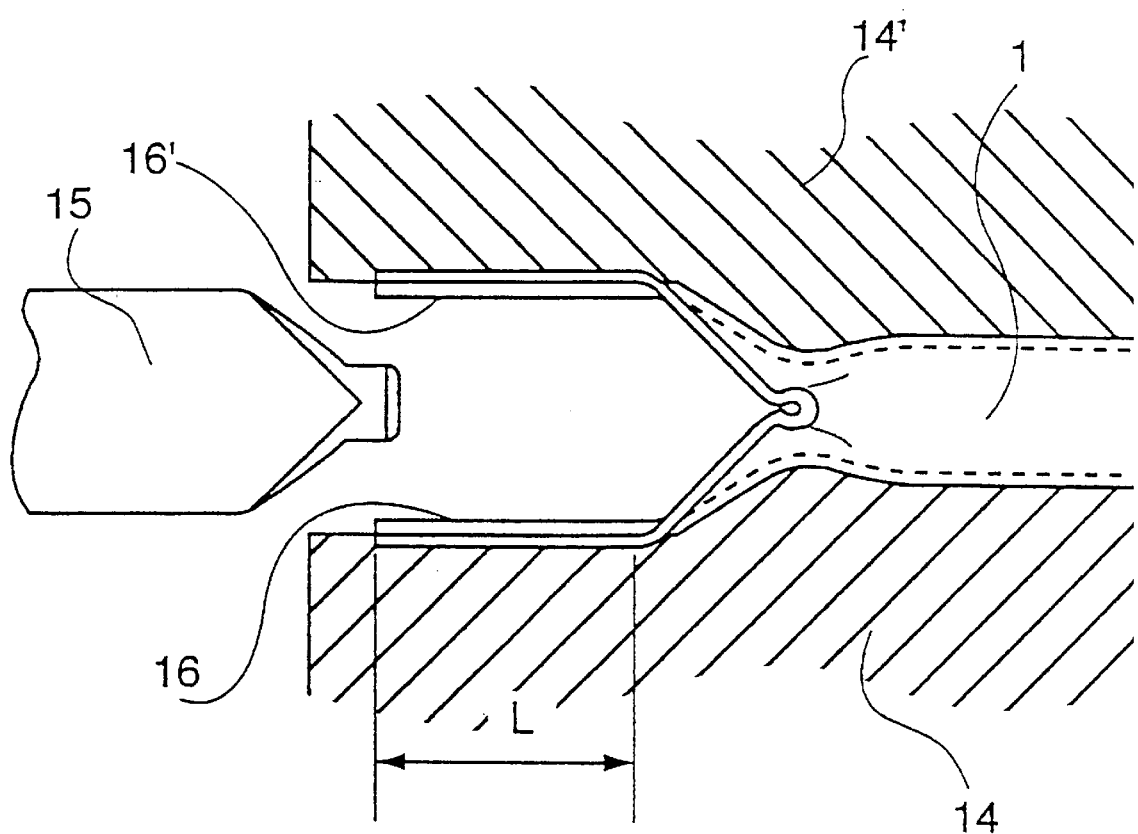
Figure 1F:
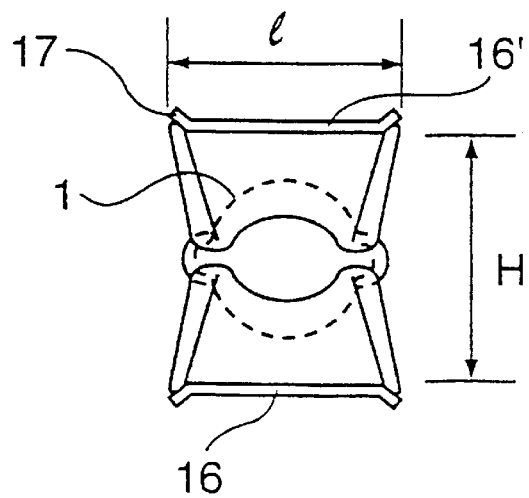
Figure 1:
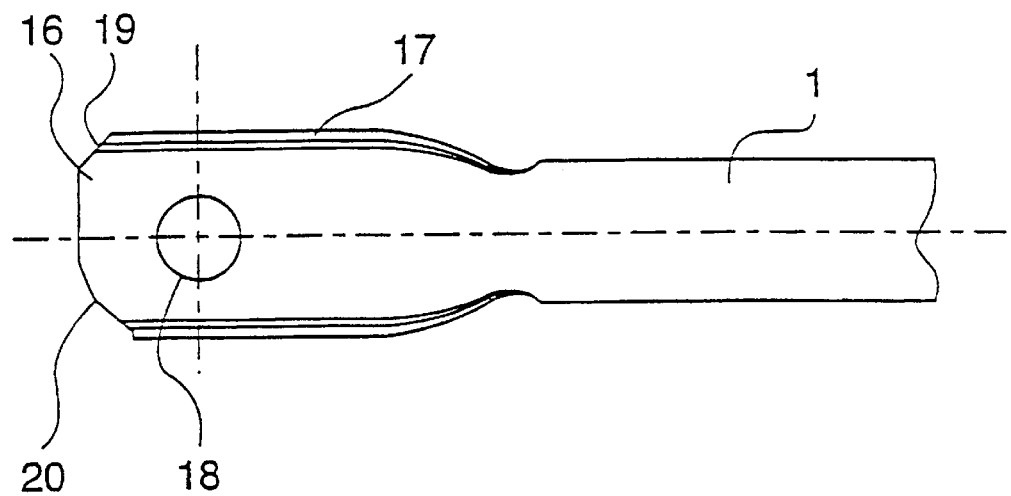

FIGS. 1 *a*) and 1 *b*) show the operation for flattening the length of tube 1.

The length of tube 1 used for making the part in that example is a cylindrical tube portion with a constant section. The extremity of this tube portion undergoes, over a certain length, a first flattening operation.

This flattening operation is done between two shaping dies, 2 and 2', and results in the shaping of two longitudinal beads, 3 and 3', of a given length, on opposite generating lines of the tube portion, the beads forming a metal fold, edge-to-edge, in the shape of a hair pin.

FIGS. 1 *c*) and 1 *d*) show the cutting operation for beads 3, 3' at the flattened extremity.

This extremity is held here between a stationary lower die 4 and an upper blank holder 5.

A vertically mobile upper die 6 allows to slide cutting tools 7 and 7' laid out at 3*h* and 9*h* (in analogy to the position of the hour needle on a clock), along the aligned lateral edges 8 and 9, and 8' and 9', respectively, of lower die 4 and blank holder 5.

Blank holder 5 leans against the upper extremity of the flattened tube by way of a spring 10 positioned between the blank holder 5 and the mobile upper die 6.

The sliding down of the upper die 6 results in the cutting of outside projections 11, 11' of beads 3, 3' by tools 7, 7'.

This is how we obtain two symmetrical tongues, 12 and 12', whose curvature is that of dies 2 and 2', and which ends laterally with a counter-curvature such as 13.

The scraps from cuttings 11, 11' are ejected toward the outside in the direction of arrows F, F' in FIG. 1 *c*).

FIGS. 1 *e*) and 1 *f*) show the operation for shaping the fork link wings.

The tube portion and its tongues 12, 12' are clamped between two shaping dies 14–14' while punch 15 is inserted inside the split extremity and spreads tongues 12–12' against the inside surface of dies 14–14'.

Tongues 12, 12' then take on wing shapes 16, 16' of L length, and 1 width, parallel to each other and the tube portion 1, at a distance H from each other. The wings obtained 16–16' are flat except on the lateral edges, such as 17, which are bent toward the outside of the part, this bending being the result of a counter-curvature such as 13, itself a result of a folding-over such as 3.

Bending such as 17 allows to render wings 16, 16' rigid, and to keep them from sagging longitudinally, or to become twisted during the end use of the finished part.

FIG. 1 g) shows a fork link obtained on the extremity of tube portion 1 after finishing operations such as:
- piercing of holes such as 18, across from the two wings 16–16' for inserting a pin or a spider web.
- cutting of a chamfer such as 19, and/or a curvature finishing such as 20 at the longitudinal extremities of wings 16, 16'.

Process in accordance with the invention allows to manufacture such fork links from a wide range of tube sizes (diameter, thickness), without any particular criticality along the length L of fork link wings, width 1 and spacing H.

Figure 2:
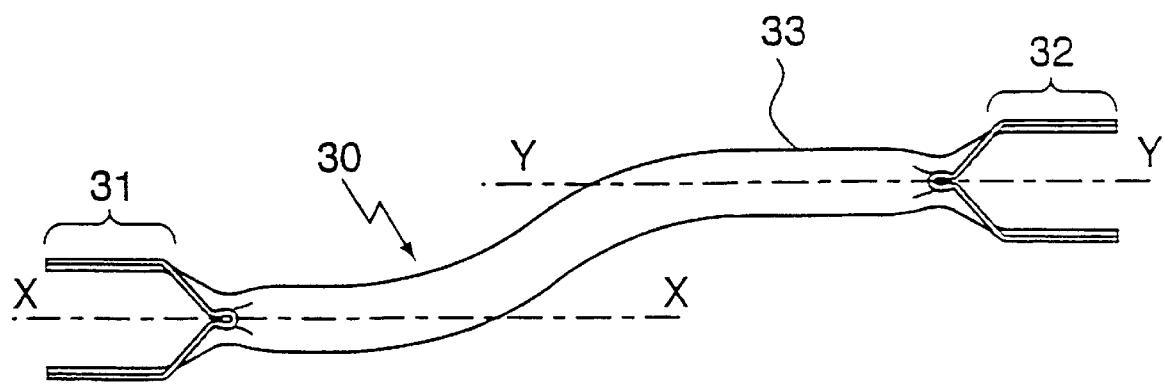
FIG. 2 shows an example of a bent tube portion with a fork link at each extremity.

FIG. 2 shows an integral tubular part 30 obtained from structural steel tube 33 with an outside diameter of 36 mm and a thickness of 4 mm, bent twice at the center and outfitted with fork links 31 and 32 at each extremity; fork links obtained as described in FIG. 1.

The length of the fork link wings, in the example under consideration, is 50 mm, their width 42 mm, and their spacing 56 mm. Holes 16 mm in diameter are made facing each other on each wing.

In the example shown, symmetry plan XX of the fork link 31 is parallel to the symmetry plan YY of the other fork link 32, at a distance of 76 mm from the other one, but these two plans could form together an angle in the case of other kinds of similar parts.

FIG. 3 shows a semi-rigid rear axle 101 manufactured via the process in accordance with the invention, to be used in a motor vehicle.

This axle is obtained from a weldable structural steel tube, whose central portion 102 undergoes shaping via appropriate mechanical or hydroforming means, so as to constitute an elastic torsion part of a known rigidity. The right section of the central portion 102 is shown in FIG. 5.

Each extremity of axle 101 consists of two wings 103 and 104, without transverse curvature except for a bend such as 116 at the edges (FIG. 4) and attached to the central portion 102, angle Y formed at the beginning by the two wings being on the order of 90°, and the extremity of the wings being perpendicular to axis XX of the initial tube.

The extremities of wings such as 103 or 104 may be outfitted on wing 104 with elastic support bearings 105 which are articutated with the vehicle body, and on wing 103 with stub axles and helical spring extremity supports 107.

Wings 103 and 104 on a same extremity are rendered rigid and the angle between them closed by a housing 108, made of U-shaped sheet metal cut to follow the contour of the wings, each branch 110–110' of the U-shaped housing being welded onto 109–109' on the folded edge, such as 116, of the corresponding wing as indicated in FIG. 4.

Part 101 is obtained by having the extremities of a steel tube portion undergo a flattening operation and then a cutting of the outside projections of the two beads obtained in accordance with FIGS. 1 a) to 1 d).

Wings 103 and 104 are then shaped as shown in FIG. 6 by deformation of tongues 112 and 112' obtained after cutting.

The body of the tube is crammed inside a shaping die consisting of two parts, 114 and 114'.

Punch 115 comes to separate the tongues 112–112' and push them against the lateral surface of the two die parts 114–114' until forming a Y; each wing thus shaped is straightened transversally so as to remove any significant curvature in this direction, except for a small fold 116 at the lateral edges. Such a wing profile allows to center them longitudinally without any risk of tearing the most elongated areas.

Housing 108 and parts 105, 106 and 107 are then attached via welding.

Many variations and modifications may be made to the process in accordance with the invention and to the wing-shaped parts obtained with the process with regard to the described examples without departing from the protected domain of the invention.

What is claimed is:

1. Process for manufacturing wing-shaped metal parts as an integral part of an extremity of a tube portion, said process comprising the following successive steps:

partially collapsing an area of an extremity of a tube portion over a certain length so as to shape at least two longitudinally extending beads projecting along an exterior surface by folding over a wall of the tube portion, cutting off the beads so as to obtain tongues separated in a longitudinal manner, and shaping of the tongues to form wings.

2. Process for manufacturing wing-shaped metal parts in accordance with claim 1, further comprising subjecting the wings to finishing operations.

3. Process for manufacturing wing-shaped metal parts in accordance with claim 1, wherein the partial collapsing operation of the extremity of the tube portion to form at least two beads is done by unsupported deformation.

4. Process for manufacturing wing-shaped metal parts in accordance with claim 1, wherein the partial collapsing operation of the extremity of the tube portion to form at least two beads is done by compression between dies to shape at least the exterior surface of the tube between the beads.

5. Process for manufacturing wing-shaped metal parts in accordance with claim 1, wherein the cutting operation is performed by shearing.

6. Process for manufacturing wing-shaped metal parts in accordance with claim 1, wherein two beads are obtained during the partial collapsing operation of the exterior surface of the tube length.

7. Process for manufacturing wing-shaped metal parts in accordance with claim 1, wherein the tongues obtained after the operation of cutting the beads are flattened during the shaping operation, only one bend being obtained by shaping the beads at a level of their longitudinal edges.

8. Process for manufacturing wing-shaped metal parts in accordance with claim 7, wherein the operation of shaping the wings results in two wings extending parallel to each other and the axis of the tube length.

9. Process for manufacturing wing-shaped metal parts in accordance with claim 8, wherein the wings are finished by piercing holes across from each other.

10. Process for manufacturing wing-shaped metal parts in accordance with claim 6, wherein the operation for shaping the wings results in two Y-shaped wings forming a dihedral angle of less than 180° at a merging point of the wings.

11. Process for manufacturing wing-shaped metal parts in accordance with claim 10, wherein the process is performed at opposite ends of the tube portion.

12. Process for manufacturing wing-shaped metal parts in accordance with claim 11, further comprising a welding operation between a housing with a U-section and the two wings forming the dihedral angle at the extremities of the tube portion of the metal parts, said welding operation is carried out along edges of the wings to rigidify and enclose the wings.

* * * * *